United States Patent Office 3,715,410
Patented Feb. 6, 1973

3,715,410
CONVERSION OF CYCLIC OLEFINS TO ACYCLIC POLYENES
Gardner C. Ray and Donald L. Crain, Bartlesville, Okla., assignors to Phillips Petroleum Company
No Drawing. Continuation of application Ser. No. 529,230, Feb. 23, 1966. This application June 20, 1969, Ser. No. 845,596
Int. Cl. C07c 3/20
U.S. Cl. 260—680 R      23 Claims

ABSTRACT OF THE DISCLOSURE

Cyclic olefins are converted to acyclic polyenes by reaction with acyclic olefins in the presence of an olefin disproportionation catalyst.

---

This application is a continuation of application Ser. No. 529,230, filed Feb. 23, 1966 and now abandoned.

This invention relates to the conversion of cyclic olefins to acyclic polyenes. In one aspect, the invention relates to the reaction of cyclic monoolefins and acylic olefins in the presence of an olefin disproportionation catalyst. In another aspect, this invention relates to the production of alpha, omega diolefins by the reaction of cyclic monoolefins and ethylene. In still another aspect, this invention relates to the production of acyclic non-conjugated polyenes.

Acyclic polyenes have been prepared by such processes as dehydrogenation and halogenation followed by dehydrohalogenation. Most acyclic polyenes produced by such processes, such as diolefins for example, are conjugated diolefins which can be prepared by dehydrogenation of saturated hydrocarbons or monoolefins of the same chain length. However, other non-conjugated diolefins are generally less plentiful. For example, alpha, omega diolefins having at least 6 carbon atoms are relatively expensive chemicals, not available in large quantities. Alpha, omega diolefins are highly useful in chemical synthesis, as they can be converted to such materials as diols containing the hydroxyl groups attached to the terminal carbon atoms. Such diols are useful in the preparation of polyesters, and in the production of plasticizers. Similarly, acyclic polyenes having one terminal double bond and one or more internal double bonds are useful for homo- or co-polymerization to yield polymers which can be readily cross-linked.

An object of this invention is to convert cyclic olefins to acyclic olefins.

Another object of this invention is to produce alpha, omega diolefins.

Another object of this invention is to produce non-conjugated acylic polyenes.

Other aspects, objects and the advantages of my invention are apparent in the written description and the claims.

According to this invention, cyclic olefins, which can be monoolefinic or non-conjugated polyolefinic, are converted to acyclic polyenes by reaction with acyclic olefins in the presence of an olefin disproportionation catalyst. The reaction of this invention can be described in terms of the following exemplary equation although the invention is not limited by any particular theory of operation. Thus, for example, the reaction between cyclopentene and ethylene proceeds as follows:

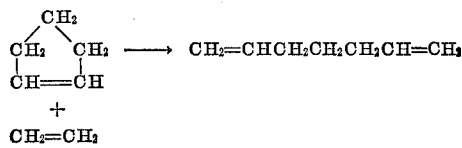

In a similar manner, the cyclic monoolefin, such as cyclohexene can be reacted with propylene to yield a nonconjugated acyclic diolefin having both a terminal double bond and an internal double bond, namely, 1,7-nonadiene as shown below:

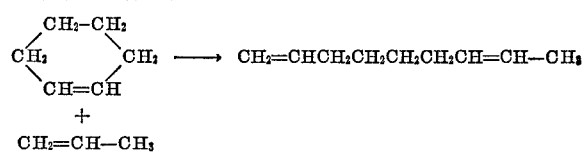

Similarly, the reaction of an internal acyclic monoolefin, such as butene-2, with cyclopentene produces 2,7-nonadiene, an acyclic diolefin with two internal double bonds. It is seen, therefore, that, barring any double bond isomerization which may occur, a wide variety of specific olefin products can be prepared by utilizing selected reagent olefins. Cyclic polyenes, having more than one point of reaction, may produce more than one product. Depending upon conditions, primary products can be further reacted to produce secondary products within the reaction zone.

Cyclic olefins which are applicable for use in this invention are cyclic monoolefins and cyclic non-conjugated polyenes having 2–5, preferably 2–3, ring double bonds. The cyclic olefin can be substituted with aryl, alkyl, cycloalkyl, cycloalkenyl, and combinations of these such as alkaryl and aralkyl radicals containing from 1–20 carbon atoms and the total number of carbon atoms in the reacting cyclic olefin does not exceed 30. Excellent results are obtained with compounds wherein the cyclic olefin ring contains up to 12 carbon atoms. Some examples of suitable cyclic olefins are:

cyclopropene
cyclobutene
cyclopentene
cyclohexene
cycloheptene
cyclooctene
cyclononene
cyclodecene
cyclododecene
1,5-cyclooctadiene
1,5,9-cyclododecatriene
1,4,7,11,14-cyclooctadecapentaene
4-phenylcycloheptene
1-methylcyclopentene
3,3-dimethyl-5-benzylcyclodecene
3-n-hexyl-5-cyclopentylcyclododecadiene-1,9
5-p-tolylcycloheptene
4-(3-cyclohexen-1-yl)cyclodecene
bicyclo[3,3,0]octene-2
cyclotridecene Cyclic monoolefins and cyclic diolefins having up to about 12 carbon atoms per molecule are presently preferred and the use of cyclopentene, cyclooctene, cyclononene, cyclodecene and 1,5-cyclooctadiene has been found particularly advantageous.

The acyclic olefins which are applicable for use in the present invention are preferably acyclic monoolefins and their aryl, alkyl and cycloalkyl derivatives having 2 to about 30 carbon atoms per molecule. Excellent results are obtained with linear monoolefins having 2–12 carbon atoms. Some examples of suitable acyclic olefins are:

ethylene
propylene
butene-1
butene-2
isobutene
1-pentene
2-pentene 1-hexene
2-heptene
1-octene
3-nonene
5-dodecene
4-tetradecene
1-hexadecene
2-methyl-1-butene
2-methyl-2-butene
3-methyl-1-pentene
1-eicosene
4-vinylcyclohexene
6-cyclopentyl-1-hexene
3-methyl-5-benzyl-1-octene
1-tridene Particularly preferred acyclic olefins are ethylene and unbranched olefins having from 4 to 12 carbon atoms per molecule.

The catalysts which are suitable for carrying out the conversion of the present invention are any of those which show activity for disproportionating olefins into other olefins of both higher and lower molecular weight. Some examples of such catalysts are those which comprise or are prepared from such materials as oxides of molybdenum, tungsten, vanadium, niobium, tantalum, and rhenium, and hexacarbonyls and sulfides of tungsten and molybdenum. These catalytic promoters are generally associated with catalytic support materials such as silica, alumina, silica-alumina, magnesia-titania, and thoria. The catalytic agents are the reaction products resulting from the admixture, under activating conditions, of such promoter materials and such support materials. Other inert materials may also be present in the catalyst composition in minor amounts. In addition, the catalyst can contain minor amounts of some materials which, in some instances, exert a beneficial effect on the process. Such materials can include cobalt oxide and alkaline substances such as compounds of the alkali and alkaline earth metals.

Some suitable catalysts are disclosed in U.S. Ser. No. 94,996, Banks, filed Mar. 13, 1961, now U.S. Pat. No. 3,463,827, Ser. No, 312,209, Banks, filed Sept. 27, 1963, now U.S. Pat. No. 3,261,879, and Ser. No. 307,371, Heckelsberg, filed Sept. 9, 1963 and now abandoned. Some specific examples of suitable catalysts include cobalt molybdate or molybdenum hexacarbonyl on alumina, as well as tungsten oxide on silica, alumina or silica-alumina. A presently favored catalyst is molybdenum oxide on alumina which has been treated with 0.01 to 3 weight percent KOH.

My invention is not limited to the use of a specific disproportionation catalyst but any catalyst suitable for disproportionation of olefins can be utilized.

The above-described catalysts generally contain from about 0.1 to about 30 weight percent of the promoter material based on the total composite. The catalyst can be prepared and activated by conventional means. For example, a catalytic grade alumina gel can be impregnated with an aqueous solution of ammonium molybdate. Drying and calcining to temperatures of about 1100° F. complete the catalyst preparation. In a similar manner, a silica gel can be impregnated with ammonium metatungstate, dried and calcined. Tungsten sulfide can be ball-milled with thoria followed by heating in an inert gas such as nitrogen at 800–1400° F. A pre-calcined silica-alumina can be impregnated with a solution of molybdenum hexacarbonyl in a non-aqueous solvent such as benzene and then directly used in a liquid phase reaction. Optionally, the impregnated solid can be dried and heated at temperatures of up to 1000° F. in an inert atmosphere to form the catalyst.

The finished catalyst can be in the form of powder, or granules as well as in other shapes such as agglomerates, pellets, spheres, extrudates, beads, and depending upon the type of contacting technique which utilizes the catalyst.

One or more cyclic olefins can be reacted with one or more acyclic olefins according to this invention, thus producing mixtures of acyclic polyenes. Utilizing a single cyclic monoolefin and a single acyclic olefin, high yields of a particular desired acyclic diolefin can be produced. The process is carried out by contacting one or more cyclic olefins with an acyclic olefin over an olefin disproportionation catalyst at pressures of 0–2000 p.s.i.g. or higher for periods of 0.1 second to 24 hours or more. Depending upon the specific catalyst utilized, the conversion can be carried out at temperatures which may range from about 0 to about 1200° F. For example, a molybdenum hexacarbonyl catalyst can employ temperatures of 0–600° F.; a molybdenum oxide on alumina catalyst can employ temperatures of 150–500° F.; tungsten oxide on silica gel generally utilizes 400–1100° F.; while tantalum oxide on silica is operable at 700–1200° F. It is preferred to utilize a low conversion, below 50 percent for example, and more preferably below 25 percent, to avoid the production of large quantities of undesired by-products. Preferably, the mole ratio of acyclic olefin to cyclic olefin (or mixture of cyclic olefins) is from about 1:5 to 5:1. A molar excess of the cyclic olefin is frequently beneficial. However, when ethylene is employed, the ethylene to cyclic olefin ratio in the range of 3–10 is most satisfactory.

The process can be carried out in the presence or absence of a diluent which is non-reactive under the conditions of the reaction, the amount of diluent generally varying from 0 to 90 percent by volume of the reaction mixture. Suitable diluents include saturated hydrocarbons such as alkanes and cycloalkanes. A particular diluent, if used, should be selected to have a boiling point suitably separated from the boiling point of the reactant cyclic olefin and the product of the reaction to simplify subsequent separation.

The process can be carried out batch-wise or as a continuous process. In a batch process, the catalyst generally comprises from about 0.5 to about 25 percent by weight of the reaction mixture. When operating on a continuous basis, the catalyst can be employed as a fixed bed over which cyclic olefin feedstock and recycle is passed at a suitable rate to obtain the desired conversion at the chosen reaction conditions. Under proper conditions, other types of contacting techniques can be used, such as fluidized or ebulated bed.

The initial products of the reaction of a cyclic olefin with a suitable acyclic olefin according to this invention are acyclic polyenes. These products have wide utility as described previously, and can be produced in high ultimate yields but by utilizing low per pass conversions to avoid excessive side reactions and double bond isomerization.

The following specific examples are intended to illustrate the advantages of the process of this invention and are not intended to limit the invention to the particular features shown in the examples.

EXAMPLE I

Reaction of cyclopentene and ethylene

A run was carried out in which ethylene and cyclopentene were reacted over a supported molybdenum hexacarbonyl catalyst to produce 1,6-heptadiene according to the process of this invention. In this run, alumina pellets were heated at 1000° F. for six hours while passing air over the pellets, after which the container in which the pellets were heated was flushed with nitrogen and the temperature allowed to drop slowly to about 70° F. The pellets were then treated with molybdenum hexacarbonyl, using 17.2 parts by weight of pellets and 1 part by weight of the molybdenum compound in 12.5 parts by weight of dry cyclohexane. The mixture then was heated to 158° F. for 45 minutes, after which the cyclohexane was removed by evaporation and the remainder heated at 275° F. for about 2 hours.

13 parts by weight of the resulting catalyst was then charged to an autoclave along with 61.8 parts by weight of cyclopentene. This mixture was blanketed with nitrogen during charging, then flushed with nitrogen and sealed in the autoclave. The autoclave was then pressured to 1000 p.s.i.g. with ethylene and stirring was commenced While stirring the mixture, the mixture was heated to 257° F. and maintained at this temperature for 2.5 hours, after which it was cooled to room temperature. Unconverted ethylene then was vented through a Dry Ice trap, and the condensed material added to the liquid in the pot yielding 53.4 parts by weight of liquid product. A chromatographic analysis showed two components present, cyclopentene and a $C_7$ compound. This compound amounted to 17.9 weight percent of the mixture.

The above liquid product was then fractionated and 6.2 parts by weight of 1,6-heptadiene was recovered.

EXAMPLE II

Reaction of cyclooctene and ethylene

A run was carried out in which cyclooctene and ethylene were reacted over another variety of a supported molybdenum olefin disproportionation catalyst to produce 1,9-decadiene according to the process of this invention. In this run, the catalyst employed was prepared by impregnating alumina with a cobalt and molybdenum compound and thereafter activating the catalyst. This catalyst contained 3.42 weight percent CoO, 11.0 weight percent $MoO_3$ and 85.6 weight percent $Al_2O_3$. The catalyst had a surface area of 284 m.²/gram and was activated at 1000° F. for 8 hours under air.

In this run, 84 parts by weight of purified cyclooctene and 10 parts by weight of the above-described catalyst were charged to an autoclave after which the autoclave was sealed and pressured to 500 p.s.i.g. with ethylene. The contents of the autoclave were then heated to 257° F. for 2 hours, after which the reactor was cooled to room temperature, the excess ethylene vented and the liquid product recovered. The liquid product amounted to 69.8 parts by weight. Gas-liquid chromatographic analysis of this liquid showed that the conversion of cyclooctene in this run was 31.1 percent while the per pass yield of 1,9-decadiene was 20.5 percent. The ultimate yield of 1,9-decadiene thus was 66.1 percent.

EXAMPLE III

Reaction of cyclohexene and ethylene

Another run was carried out by the method and catalyst of Example II except that cyclohexene and ethylene were reacted together to produce 1,7-octadiene. In this run, 162 parts by weight of cyclohexene and 12 parts by weight of the catalyst of Example II were charged to an autoclave after which the autoclave was pressured to 750 p.s.i.g. with ethylene, heated to 257° F. for 3 hours, and allowed to cool. The reactor was vented through a Dry Ice trap and the liquid effluent recovered from the reactor. The liquid effluent amounted to 142.5 parts by weight. A sample of the liquid effluent was analyzed by gas-liquid chromatography which showed that 35.9 mole percent of the product olefins consisted of 1,7-octadiene.

In another test carried out under similar conditions except that cyclododecene was the cyclic olefin utilized, the alpha, omega-tetradecadiene was found in the olefin products. The cyclododecene conversion was about 22 percent.

EXAMPLE IV

Reaction of 1,5-cyclooctadiene and ethylene

The catalyst used in this run was a molybdena on alumina catalyst in the form of ⅛ in. extrudates and which contained about 13 weight percent molybdenum oxide. Before use it was treated with about 2 weight percent, based on the catalyst, of KOH in aqueous solution. Drying and calcining at 1000° F. in the presence of air for 6–8 hours completed the catalyst activation.

A 50 ml. quantity of the above prepared catalyst was charged into a stainless steel tubular reactor under nitrogen. At a temperature of 248° F. and pressure of 600 p.s.i.g., 1,5-cyclooctadiene was pumped through the reactor at a rate of 100 ml./hr. together with sufficient ethylene to provide a 9.7 molar ratio of ethylene to the diene.

The effluent obtained after 30 minutes of operation was collected and analyzed. The conversion of 1,5-cyclooctadiene was 20.02 percent. The ultimate yield of 1,5,9-decatriene was found to be 46.5 percent.

EXAMPLE V

Reaction of cyclopentene and propylene

A catalyst comprising 11.0 weight percent molybdena and 3.4 weight percent cobalt oxide with alumina as the remainder was treated with 1 weight percent KOH, based on the catalyst, in aqueous solution followed by drying and calcination in air for 5 hours at 1000° F.

A 75 ml. quantity of the above prepared catalyst was charged into a tubular reactor. Over a 2¾ hour period, 650 ml. of cyclopentene was pumped through the reactor at 260° F. and 400 p.s.i.g. together with sufficient propylene to provide a 2.08 molar ratio of propylene to cyclopentene.

The effluent from the reactor, after evaporation of the residual propylene, totalled 480 g. This reaction mixture was analyzed by gas chromatography and the distribution of products was as follows:

| Product: | Mole percent |
|---|---|
| Butenes | 19.98 |
| Octadienes | [1] 49.29 |
| $C_{10}$ olefin | 8.14 |
| $C_{12}$ diene | 5.56 |
| $C_{13}$ triene | 13.71 |
| $C_{13}$ olefin | 3.19 |

[1] About 22.25 mole percent was 1,6-octadiene.

EXAMPLE VI

Reaction of cyclopentene and 1-octene

A catalyst was prepared by impregnating alumina pellets, which had been pre-dried by calcination at 1000° F., with a cyclohexane solution of molybdenum hexacarbonyl such that, after drying the composite under nitrogen at 257° F., a catalyst containing about 7 weight percent molybdenum hexacarbonyl was obtained.

The above-prepared catalyst, about 14 g., was charged under nitrogen to a reactor together with 20 ml. cyclopentene and 10 ml. 1-octene. The reactor was closed and heated by an oil bath for 1.5 hours at 234° F. during which time the pressure rose to 25 p.s.i.g.

The reactor was then cooled and the contents subjected to gas chromatographic analysis. The results, in terms of area percent, are shown below:

| | Area, percent |
|---|---|
| Cyclopentene | 60.27 |
| Octenes | 34.87 |
| Nonenes | Trace |
| Dodecene | 0.21 |
| Tridecadiene | 3.65 |
| Tridecene | 0.46 |
| Tetradecene | 0.54 |

The presence of the tridecadiene, in the reaction mixture illustrated the reaction between cyclopentene and 1-octene.

Reasonable variation and modification are possible within the scope of this invention which sets forth a process for converting cyclic olefins to acyclic polyenes.

We claim:

1. A process which comprises converting a cyclic olefin and an acyclic olefin to an acyclic polyene having a larger number of carbon atoms and a larger number of double bonds per molecule than said cyclic olefin by contacting said cyclic olefin and said acyclic olefin with a catalyst under conditions including conditions of temperature, pressure and contact time suitable for producing said acyclic polyene wherein said catalyst is selected from catalysts compriing a promoter selected from the group consisting of oxides of molybdenum, tungsten, vanadium, niobium, tantalum and rhenium and hexacarbonyls and sulfides of tungsten and molybdenum supported on a material selected from the group consisting of silica, alumina, silica-alumina, magnesia-titania, and thoria, and wherein said cyclic olefin is selected from the group consisting of cyclic monoolefins and cyclic non-conjugated polyenes having 2–5 ring double bonds, said cyclic olefin further being nonsubstituted or substituted with aryl, alkyl, cycloalkyl, or cycloalkenyl radicals or combinations of these radicals and said temperature conditions include a temperature at which each of said catalysts is suitable for producing said acyclic polyene, each said temperature being within the range of 0–1200° F.

2. A process which comprises converting a cyclic olefin and an acyclic olefin to an acyclic polyene by contacting said cyclic olefin and said acyclic olefin with a catalyst under conditions including conditions of temperature, pressure and contact time suitable for producing said acyclic polyene wherein said catalyst is selected from catalysts comprising a promtor selected from the group consisting of oxides of molybdenum, tungsten, vanadium, niobium, tantalum and rhenium and hexacarbonyls and sulfides of tungsten and molybdenum supported on a material selected from the group consisting of silica, alumina, silica-alumina, magnesia-titania, and thoria, and wherein said cyclic olefin is selected from the group consisting of cyclic monoolefins and cyclic nonconjugated polyenes having 2–5 ring double bonds, said cyclic olefin further being nonsubstituted or substituted with aryl, alkyl, cycloalkyl, or cycloalkenyl radicals or combinations of these radicals, and said temperature conditions include a temperature at which each of said catalysts is suitable for producing said acyclic polyene, each said temperature being within the range of 0–1200° F.

3. The process of claim 2 wherein said cyclic olefin is selected from the group consisting of cyclic monoolefins and cyclic nonconjugated polyenes having 2–5 ring double bonds, said cyclic olefin further being nonsubstituted or substituted with aryl, alkyl, cycloalkyl, or cycloalkenyl radicals or combinations of these radicals wherein the total carbon atoms in the substituting radicals does not exceed 20 and the total number of carbon atoms in the reacting cyclic olefin does not exceed 30 and wherein said acyclic olefin is selected from nonsubstituted acyclic monoolefins and aryl, alkyl and cycloalkyl derivatives thereof having 2–30 carbon atoms per molecule and wherein said conditions include a pressure of 0–2000 p.s.i.g. and a contact time of 0.1 second–24 hours.

4. The process of claim 3 wherein said nonconjugated polyenes have 2–3 ring double bonds.

5. The process of claim 3 wherein said cyclic olefin has up to 12 carbon atoms in the ring structure and said acyclic monoolefin has 2–12 carbon atoms per molecule.

6. The process of claim 4 wherein said acyclic monoolefin is ethylene and the mol ratio of ethylene to cyclic olefin is in the range of 3 to 10.

7. The process of claim 2 wherein said support material is selected from the group consisting of silica, alumina and silica-alumina.

8. The process of claim 2 wherein said catalysts are selected from the group consisting of molybdenum hexacarbonyl supported on alumina, molybdenum oxide supported on alumina, and tungsten oxide supported on silica, silica-alumina or alumina and wherein when said catalyst comprises molybdenum hexacarbonyl the temperature is in the range of 0–600° F., when said catalyst comprises molybdenum oxide on alumina said temperature is in the range of 150–500° F., and when said catalyst comprises tungsten oxide on silica gel, said temperature is in the range of 400 to 1100° F.

9. The process of claim 2 wherein the mol ratio of said acyclic olefin to said cyclic olefin is in the range of 1:5 to 5:1.

10. The process of claim 2 wherein the acyclic olefin is ethylene and the mol ratio of ethylene to said cyclic olefin is in the range of 3:1 to 10:1.

11. The process of claim 2 wherein the acyclic monoolefin is ethylene or butene-2 and the cyclic olefinic reactant has up to 2 carbocyclic rings and up to 3 ethylenic linkages.

12. The process of claim 11 wherein the acyclic monoolefin is ethylene and said contacting is effected at a pressure of about 0 p.s.i.g. to about 2000 p.s.i.g.

13. The process of claim 12 wherein the catalyst is molybdenum trioxide, present in an amount of from 0.067% by weight to about 20% by weight calculated as molybdenum on the catalyst support, and said alkali metal is potassium.

14. The process of claim 2 wherein said catalyst composition further include a minor amount of a compound of an alkali or alkaline earth metal.

15. The process of claim 14 wherein the acyclic monoolefin is a linear monoolefin having 2 to 12 carbon atoms and the cyclic non-conjugated polyene reactant has 2–3 ring double bonds.

16. The process of claim 15 wherein the acyclic monoolefin is ethylene or an unbranched acyclic monoolefin having 4–12 carbon atoms per molecule.

17. The process of claim 16 wherein the acyclic monoolefin is ethylene or butene-2.

18. The process of claim 16 wherein the acyclic monoolefin is ethylene and said contacting is effected at a pressure of 0 p.s.i.g. to about 2000 p.s.i.g.

19. The process of claim 15 wherein the catalyst is molybdenum trioxide on a support of alumina.

20. The process of claim 19 wherein the catalyst is molybdenum trioxide on a support of alumina, the molybdenum trioxide being present in an amount of from about 0.1 to about 30 percent by weight on the catalyst support, the catalyst further including an alkali metal compound which is potassium hydroxide.

21. The process of claim 20 wherein the catalyst composition additionally contains cobalt oxide.

22. The process of claim 21 wherein the cyclic olefin reactant is a monocyclic, monoolefinic reactant having up to 12 carbon atoms.

23. The process of claim 22 wherein the cyclic olefinic reactant is cyclopentene.

References Cited

UNITED STATES PATENTS

| | | | |
|---|---|---|---|
| 2,333,903 | 11/1943 | Thomas | 260—666 A |
| 2,448,641 | 9/1948 | Whitman | 260—666 A |
| 2,517,839 | 8/1950 | Carnell | 260—666 A |
| 2,728,802 | 12/1955 | Closson et al. | 260—666 X A |
| 3,058,963 | 10/1962 | Vandenberg | 260—85.3 X |
| 2,614,137 | 10/1952 | Chenicek | 260—683 X |
| 3,070,638 | 12/1962 | Voltz | 260—668 |
| 3,287,427 | 11/1966 | Karol et al. | 260—666 A |
| 3,395,196 | 7/1968 | Heckelsberg | 260—682 |
| 3,424,811 | 1/1969 | Mango | 260—680 |

FOREIGN PATENTS 913,852    12/1962    Great Britain _____ 260—680 C

PAUL M. COUGHLAN, JR., Primary Examiner

U.S. Cl. X.R.

260—677 R, 683 D